W. De C. MAY.
ATTACHING KNOBS TO SPINDLES.

No. 189,244. Patented April 3, 1877.

WITNESSES:
W. W. Hollingsworth
Edw. W. Byrn

INVENTOR:
Wm. De C. May
BY
ATTORNEYS.

UNITED STATES PATENT OFFICE.

WILLIAM DE COURCY MAY, OF BALTIMORE, MARYLAND.

IMPROVEMENT IN ATTACHING KNOBS TO SPINDLES.

Specification forming part of Letters Patent No. 189,244, dated April 3, 1877; application filed March 2, 1877.

*To all whom it may concern:*

Be it known that I, WILLIAM DE C. MAY, of Baltimore city, State of Maryland, have invented a new and Improved Screw-Holder for Latch-Knobs; and I do hereby declare that the following is a full, clear, and exact description of the same, reference being had to the accompanying drawing, forming part of this specification, in which—

Figure 1:
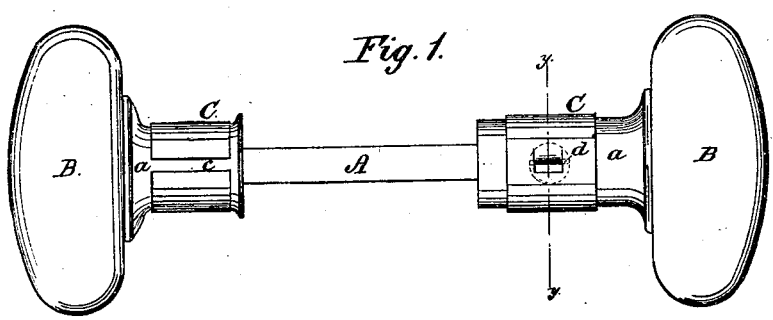
Figure 2:
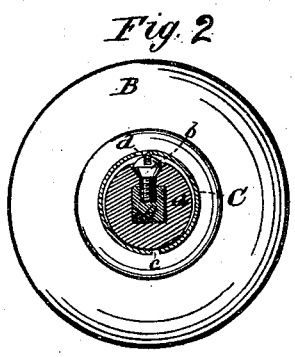

Figure 1 is a side view of the two knobs and shaft, showing tongue and slit on opposite sides of the collar or band. Fig. 2 is a cross-section through line *y y* of Fig. 1.

The object of my invention is to provide a means for preventing the loosening and loss of the screw that fastens the knob of a door to its shaft.

The improvements relate to the use of a band, ring, or sleeve made to encompass the socket portion of the knob, so as to cover the screw; and consists, first, in constructing such band or sleeve with a transverse slit, to permit the same to be opened and be sprung laterally upon the socket or shank of the knob; and, secondly, in constructing such band or sleeve with one or more tongues, which enter the nick of the screw and prevent it from turning.

In the drawing, A represents the squared shaft of an ordinary lock, upon the ends of which are arranged the knobs B B, which are fastened to the shaft by means of their sockets *a* and a screw, *b*, the socket extending over the end of the squared shaft, while the screw extends laterally through a perforation in the socket, and enters a corresponding recess in the squared shaft to hold the knob to said shaft.

From the rattle and bang of the door incident to the opening and shutting of the same these screws *b* are liable to become loosened, and in the course of time fall out, leaving the knob disengaged from the shaft, and liable to drop or be pulled off. This involves much delay and inconvenience, for the reason that the screw is of such small dimensions that it is often entirely lost, and its place has to be supplied by a new one.

In remedying this difficulty I provide a collar, sleeve, or band, C, which is made to encompass the socket *a* of the knob and cover the head of the screw *b*. This band may be either of metal, rubber, or any other suitable material, and is made with a slit or break at *c*, which opens and permits the said band to be placed laterally upon the shank or socket of the knob, the spring or elasticity of said sleeve serving to bring the ends of the band together again to close upon and clamp the said socket and its screw.

As an additional means of security, the bands are provided with little tongues *d*, which enter the nick of the screw and effectually prevent it from turning. These tongues may be struck from the metal bands, or they may be molded in the rubber or formed in any other way.

In forming these tongues, however, a number are arranged upon the same collar or band, in various angular positions with respect to the squared shaft, so that some one of them will correspond to the position of the nick of the screw when the latter is screwed up and in its place.

These bands or sleeves are made of all sizes to suit the various kinds of locks, and are suitably finished.

Having thus described my invention, what I claim as new is—

1. The encompassing collar or band, provided with a tongue, *d*, in combination with the knob having a socket, *a*, and its fastening-screw *b*, substantially as and for the purpose described.

2. The spring collar or sleeve C, slitted transversely, and combined with the knob and its holding-screw, as and for the purpose described.

WILLIAM DE COURCY MAY.

Witnesses:
J. HOWARD,
FREDERICK MAY.